(12) United States Patent
Iwamoto et al.

(10) Patent No.: US 9,740,056 B2
(45) Date of Patent: Aug. 22, 2017

(54) LIQUID CRYSTAL DISPLAY APPARATUS

(71) Applicant: STANLEY ELECTRIC CO., LTD., Meguro-ku, Tokyo (JP)

(72) Inventors: Yoshihisa Iwamoto, Tokyo (JP); Makoto Kobayashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 343 days.

(21) Appl. No.: 14/592,693

(22) Filed: Jan. 8, 2015

(65) Prior Publication Data

US 2015/0192817 A1    Jul. 9, 2015

(30) Foreign Application Priority Data

Jan. 8, 2014    (JP) ................................. 2014-001397

(51) Int. Cl.
G02F 1/1343    (2006.01)
G02F 1/1337    (2006.01)
G02F 1/139    (2006.01)

(52) U.S. Cl.
CPC ...... G02F 1/134327 (2013.01); G02F 1/1393 (2013.01); G02F 1/133707 (2013.01)

(58) Field of Classification Search
CPC ................................................ G02F 1/134327
USPC .......................................................... 349/142
See application file for complete search history.

(56) References Cited

U.S. PATENT DOCUMENTS 8,593,607 B2    11/2013 Soda

FOREIGN PATENT DOCUMENTS

JP    2012063711 A    3/2012

*Primary Examiner* — Wen-Ying P Chen
(74) *Attorney, Agent, or Firm* — Holtz, Holtz & Volek PC

(57) ABSTRACT

A liquid crystal display apparatus with electrodes comprising openings that is less susceptible to disturbance of the contour shape of the display part. The apparatus includes two substrates, a first electrode, a second electrode. A display part is demarcated in a region where the two electrodes overlap, and an offset region is set from the display part edge to the inside. The electrodes comprise first openings disposed in a non offset region, and second openings disposed in the offset region. First openings comprises a shape wherein a branch part disposed so that the longitudinal direction thereof extends along a first direction and a branch part disposed so that the longitudinal direction thereof extends along a second direction are connected. Second openings comprises openings disposed so that the longitudinal direction thereof extends along the first direction, and openings disposed so that the longitudinal direction thereof extends along the second direction.

13 Claims, 11 Drawing Sheets

LIQUID CRYSTAL DISPLAY APPARATUS

BACKGROUND OF THE INVENTION

Field of the Invention

The present invention relates to a liquid crystal display apparatus comprising an electrode with a plurality of openings.

Description of the Background Art

As an example of a VA (Vertical Alignment) mode liquid crystal display element, Japanese Unexamined Patent Application Publication No. 2012-63711 (hereinafter referred to as "Patent Document 1") discloses a liquid crystal display element comprising a first electrode disposed to display a predetermined display pattern in a display region, a second electrode that faces the first electrode, and a liquid crystal layer that is provided between the first electrode and the second electrode and in which the alignment of the liquid crystals when no voltage is applied is vertical, wherein a plurality of regularly disposed L-shaped slits is formed on either the first electrode or the second electrode. In this liquid crystal display element, each of the L-shaped slits is formed so that, within a region where at least the first electrode and the second electrode overlap, the electrode provided with the slits is a plurality of rectangular sub-pixel electrodes, and is divided into a plurality of rectangular sub-pixel electrodes comprising connecting parts on three corners for connecting adjacent sub-pixel electrodes. According to this prior art, the alignment defect that occurs when voltage is applied in a VA mode liquid crystal display element is decreased, making it possible to make the alignment of the liquid crystals more uniform.

However, for example, in a segment display type liquid crystal display apparatus comprising a display part for predetermined characters, designs, and the like, the display part for characters and the like is formed by a region where the segment electrodes of one substrate overlap with the common electrodes of the other substrate. When alignment control technology such as described above is applied to such a segment display type liquid crystal display apparatus, the inconvenience arises that lack of patterns are produced in a concentrated manner on a specific edge of the several edges that constitute the display part, and sections that should be a smooth linear shape or curve shape are viewed as jagged, resulting in disturbance in the contour shape of the display part.

Note that, this same inconvenience may occur in dot matrix display type liquid crystal display apparatuses and the like configured to comprise an edge where each pixel is bent, for example.

SUMMARY OF THE INVENTION

It is therefore an object of the specific aspects of the present invention to provide a technique capable of making a liquid crystal display apparatus that uses electrodes comprising a plurality of openings less susceptible to disturbance of the contour shape of the display part.

When the inventors studied the above problem, they gained the following knowledge, which will now be described with reference to FIGS. 12A-12C. First, consider a case where the edges of the display part are demarcated by the edges of one electrode, and openings are provided to this electrode. In this case, when an L-shaped opening 118 is disposed inside the display part, for example, a lack of pattern 140 occurs near an edge 131 of the display part if the edge 131 crosses each of the two branch parts of this opening 118 (refer to FIG. 12A). Such a lack of pattern causes disturbance of the contour shape of the display part. This inconvenience is not limited to a case where the edge 131 is linear in shape, and is the same in cases where the edge 131 is curved and in cases where the opening comprises more than two branch parts as well. Based on this knowledge, the inventors conducted intensive investigations and, as a result, came up with the technical idea that the above problem can be resolved by not disposing the respective branch parts of the openings comprising two or more branch parts within a predetermined range from the edge of the display part and disposing other openings in this predetermined range, and came to create the present invention. As one example according to this technical idea, there is a mode wherein two branch parts and the edge 131 are made not to cross by using an opening 118a wherein the alignment of the disposition of the opening 118 has been changed (refer to FIG. 12B); and, as another example, there is a mode wherein openings 118b and 118c, which are I-shaped or the like with the respective branch parts of the opening 118 broken apart, are used (refer to FIG. 12C).

[1] The liquid crystal display apparatus according to one aspect of the present invention is a liquid crystal display apparatus comprising (a) a first substrate and a second substrate disposed facing each other, (b) a first electrode provided to the first substrate, (c) a second electrode provided to the second substrate, and (d) a liquid crystal layer disposed between the first substrate and the second substrate, wherein (e) a display part is demarcated in a region where the first electrode and the second electrode overlap, and an offset region of a predetermined width from at least a part of an edge to the inside is set in the display part, (f) at least one of the first electrode and the second electrode comprises a plurality of first openings disposed in a region other than the offset region of the display part, and a plurality of second openings disposed in the offset region of the display part, in the planar view, (g) each of the plurality of first openings comprises a section wherein a branch part disposed so that the longitudinal direction thereof extends along a first direction and a branch part disposed so that the longitudinal direction thereof extends along a second direction different from the first direction are connected at respective one ends, in the planar view, and (h) each of the plurality of second openings includes a plurality of openings disposed so that the longitudinal direction thereof extends along the first direction, and a plurality of openings disposed so that the longitudinal direction thereof extends along the second direction, in the planar view.

[2] The liquid crystal display apparatus according to another aspect of the present invention is a liquid crystal display apparatus comprising (a) a first substrate and a second substrate disposed facing each other, (b) a first electrode provided to the first substrate, (c) a second electrode provided to the second substrate, and (d) a liquid crystal layer disposed between the first substrate and the second substrate, wherein (e) a display part is demarcated in a region where the first electrode and the second electrode overlap, and an offset region of a predetermined width from at least a part of an edge to the inside is set in the display part, (f) at least one of the first electrode and the second electrode comprises a plurality of first openings disposed in a region other than the offset region of the display part, and a plurality of second openings disposed in the offset region of the display part, in the planar view, (g) each of the plurality of first openings comprises a section wherein a branch part disposed so that the longitudinal direction thereof extends along a first direction and a branch part disposed so that the longitudinal direction thereof extends along a second direction different from the first direction are connected at respective one ends, in the planar view, and (h) each of the plurality of second openings has substantially the same shape as each of the plurality of first openings, and is disposed in a different orientation, in the planar view.

According to the foregoing configuration, a liquid crystal display apparatus that uses electrodes comprising a plurality of openings that is less susceptible to disturbance of the contour shape of the display part can be achieved.

[3] In the liquid crystal apparatus of the above [1] or [2], each of the plurality of first openings is substantially L-shaped, substantially T-shaped, or substantially cross-shaped, for example.

[4] In the liquid crystal display apparatus of the above [1]-[3], the width of the offset region is preferably larger than the longitudinal direction length of the branch part along the first direction and/or the longitudinal direction length of the branch part along the second direction of each of the plurality of first openings.

[5] In the liquid crystal display apparatus of the above [1]-[4], the display part is preferably a segment display type display part wherein the character or design of a display target is directly formed.

DESCRIPTION OF THE PREFERRED EMBODIMENTS

The following describes embodiments of the present invention with reference to drawings.

Figure 1:
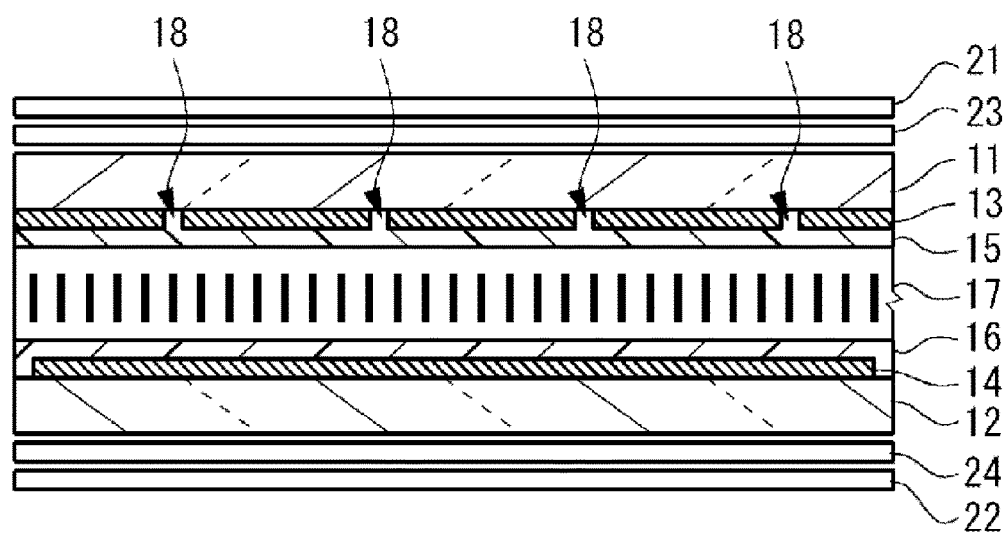
FIG. 1 is a cross-sectional view showing the basic structure of the liquid crystal display apparatus of an embodiment.

FIG. 1 is a cross-sectional view showing the basic structure of the liquid crystal display apparatus of an embodiment. This liquid crystal display apparatus comprises a first substrate 11 and a second substrate 12 disposed facing each other, a first electrode 13 provided to the first substrate 11, a second electrode 14 provided to the second substrate 12, and a liquid crystal layer 17 disposed between the first substrate 11 and the second substrate 12, as a basic configuration. For example, the liquid crystal display apparatus of this embodiment is configured so that the region where the electrodes overlap each other forms the characters and designs that the user wants to display, is basically capable of displaying only predetermined characters and the like, and is a segment display type liquid crystal display apparatus wherein generally a region of about 50% or less in terms of the area ratio inside the effective display region contributes to the display of characters and the like. Note that the liquid crystal display apparatus may be a dot matrix display type wherein a plurality of pixels is arranged in a matrix pattern, or may include both a segment display type and a dot matrix display type.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 4 μm, for example) therebetween.

The first electrode 13 is provided to one surface side of the first substrate 11. Similarly, the second electrode 14 is provided to one surface side of the second substrate 12. The first electrode 13 and the second electrode 14 are each configured by suitably patterning a transparent conductive film, such as indium-tin oxide (ITO), for example. A plurality of openings (slits) 18 is provided to the first electrode 13.

A first alignment film 15 is provided to one surface side of the first substrate 11 so as to cover the first electrode 13. A second alignment film 16 is provided to one surface side of the second substrate 12 so as to cover the second electrode 14. A vertical alignment film that restricts the alignment of the liquid crystal layer 17 to a vertical alignment is used as the first alignment film 15 and the second alignment film 16. A uniaxial alignment process such as a rubbing process is not performed on either of the alignment films 15 or 16.

The liquid crystal layer 17 is provided between the first substrate 11 and the second substrate 12. In this embodiment, the liquid crystal layer 17 is configured using a liquid crystal material with a negative dielectric anisotropy $\Delta\epsilon$. A refractive index anisotropy $\Delta n$ of the liquid crystal material is about 0.09, for example. The bold lines shown in the liquid crystal layer 17 schematically indicate the direction of alignment of the liquid crystal molecules in the liquid crystal layer 17. The liquid crystal layer 17 of this embodiment is set in a vertical alignment in which the direction of alignment of the liquid crystal molecules when a voltage is not applied is vertical with respect to each substrate surface of the first substrate 11 and the second substrate 12.

A first polarizer 21 is disposed on the outside of the first substrate 11. Similarly, a second polarizer 22 is disposed on the outside of the second substrate 12. The first polarizer 21 and the second polarizer 22 are disposed so that the respective absorption axes are substantially perpendicular to each other. Further, an optical compensator, such as a C plate, may be suitably disposed between each polarizer and each substrate. For example, according to this embodiment, optical compensators 23 and 24 are disposed between the first substrate 11 and the first polarizer 21, and between the second substrate 12 and the second polarizer 22, respectively.

Figure 2A:
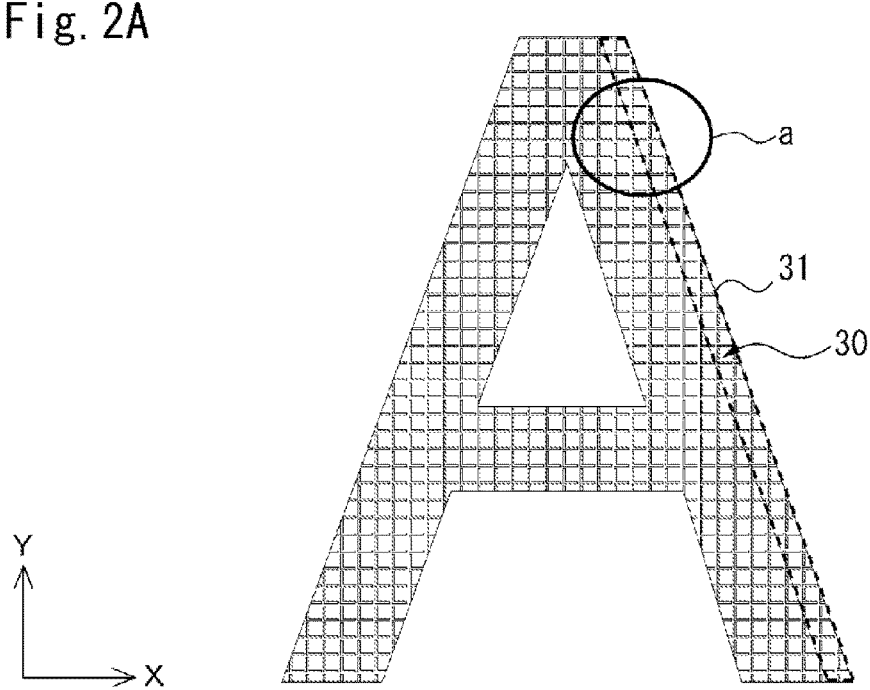
FIG. 2A is a plan view showing embodiment 1 of the display part.
Figure 2B:
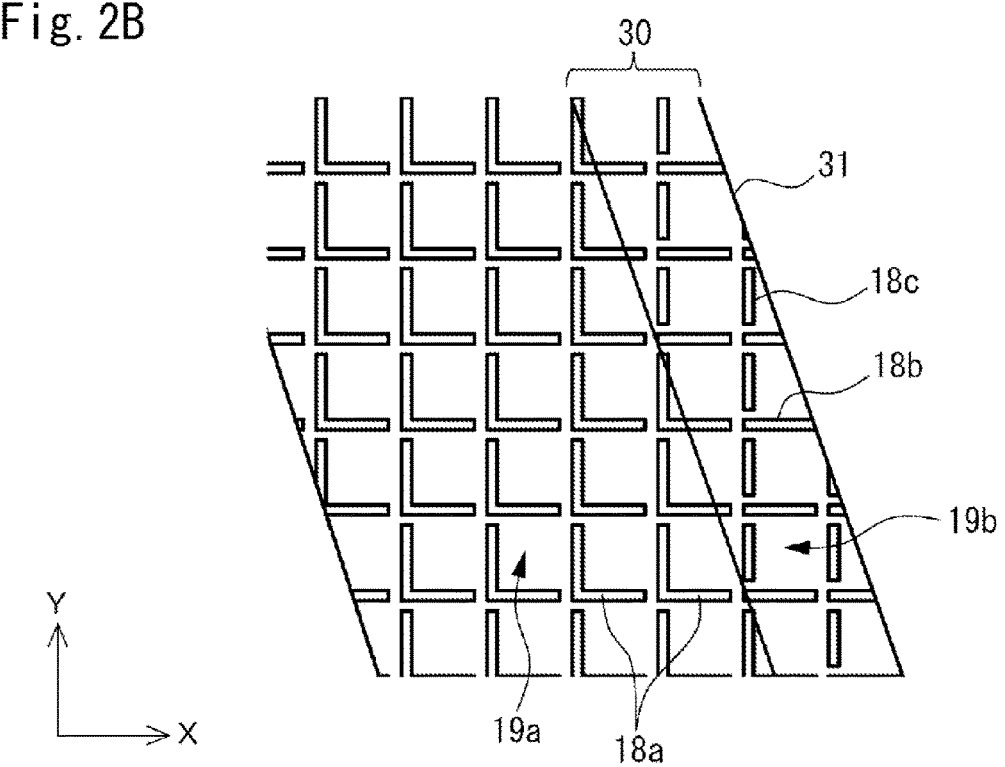
FIG. 2B is a partially enlarged view of area a of the display part shown in FIG. 2A.

FIG. 2A is a plan view showing embodiment 1 of the display part, and FIG. 2B is a partially enlarged view of area a of the display part shown in FIG. 2A. The display part of the example shown in FIG. 2A is for displaying the letter "A," and the shape of the letter "A" is demarcated by the region where the first electrode 11 and the second electrode 12 overlap (hereinafter the same). The display part may have a vertical length of approximately 3.2 mm and a horizontal length of approximately 2.8 mm, for example. The plurality of openings 18 is arranged in a matrix pattern along direction X and direction Y, respectively, in the interior of the display part.

As shown in FIG. 2B, the respective openings 18 of embodiment 1 include three types: a plurality of the L-shaped openings 18a wherein a branch part that extends in direction X and a branch part that extends in direction Y are configured to be connected at respective one ends, a plurality of the I-shaped openings 18b that extend in direction X, and a plurality of the I-shaped openings 18c that extend in direction Y. Specifically, as shown in FIG. 2B, an offset region 30 is set from a part of the edge 31 of the display part toward the inside, and the respective openings 18b and 18c are disposed in this offset region 30 while the respective openings 18a are not disposed. In this example, lack of patterns readily occur on the slanted edge 31 on the right side of the display part, and therefore the offset region 30 is set as a region of a certain width from this right-side edge (refer to FIG. 2A). The width of the offset region 30 is preferably set larger than the longitudinal direction length of the branch part of each of the openings 18a. The respective openings 18b and the respective openings 18c are disposed in the offset region 30 in pairs of one opening 18b and one opening 18c. The pair of the opening 18b and the opening 18c is disposed so that the respective one ends are near each other, forming an overall L-shape, similar to that of the each of the openings 18a. As an example, one side of each of the openings 18a and the like has a length of 0.075 mm, a width of 0.01 mm, and a disposed pitch of 0.085 mm in both direction X and direction Y. Further, the adjacent ends of the pair of the opening 18b and the opening 18c are preferably separated by a space of about 0.01 mm or larger.

The plurality of openings 18a disposed in the L-shape is regularly arranged inside the display part, forming a row in direction X and a column in direction Y.

Further, the branch parts along direction X of the openings 18a that are adjacent in direction X are linearly disposed overall, with the positions in direction Y substantially the same. Furthermore, the branch parts along direction Y of the openings 18a that are adjacent in direction Y are linearly disposed overall, with the positions in direction X substantially the same. Further, regions 19a enclosed by two branch parts of one opening 18a, one branch part along direction X of another opening 18a, and one branch part along direction Y of one opening 18a are each substantially rectangular in shape, as shown. Further, regions 19b enclosed by two openings 18b adjacent in direction Y and two openings 18c adjacent in direction X are substantially rectangular in shape, as shown. Furthermore, in this example, the region 19a and the region 19b have substantially the same shape and same area.

Figure 3A:
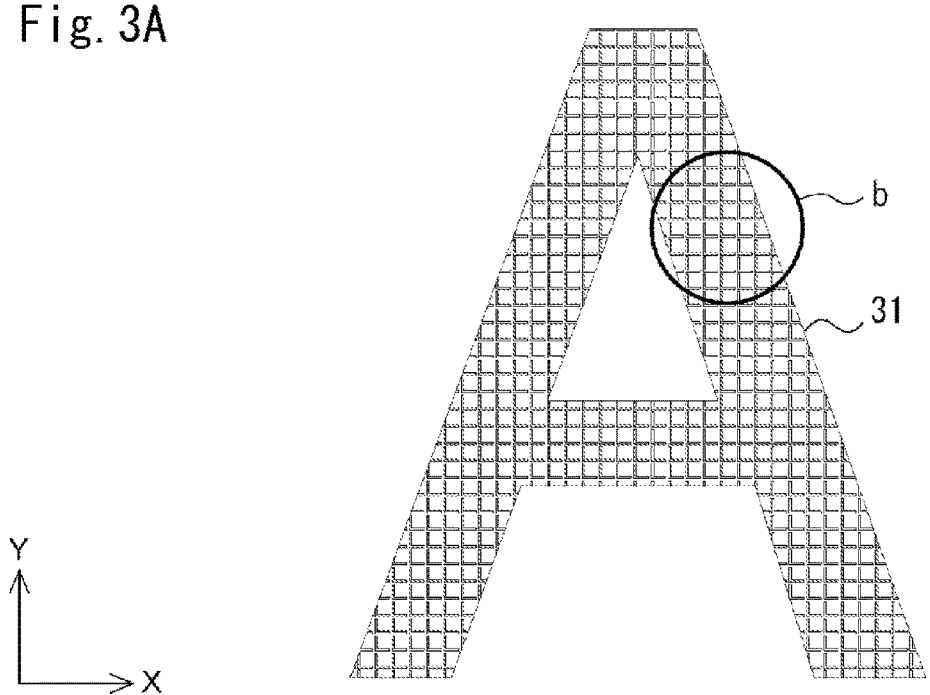
FIG. 3A is a plan view showing comparison example 1 of the display part.
Figure 3B:
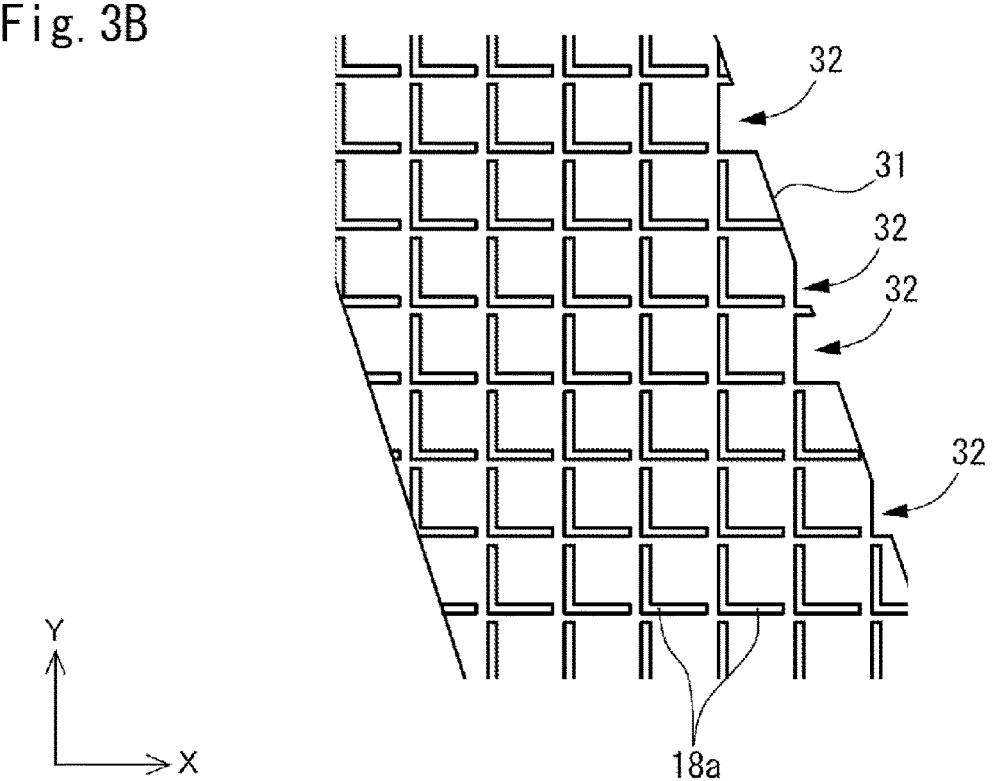
FIG. 3B is a partially enlarged view of area b of the display part shown in FIG. 3A.

FIG. 3A is a plan view showing comparison example 1 of the display part, and FIG. 3B is a partially enlarged view of area b of the display part shown in FIG. 3A. As shown in FIG. 3B, inside the display part of comparison example 1, only the plurality of L-shaped openings 18a is arranged in a matrix pattern. Specifically, the plurality of openings 18a is regularly aligned along direction X and direction Y, respectively. Further, the branch parts along direction X of the openings 18a that are adjacent in direction X are linearly disposed overall, with the positions in direction Y substantially the same. Similarly, the branch parts along direction Y of the openings 18a that are adjacent in direction Y are linearly disposed overall, with the positions in direction X substantially the same.

When the edges 31 of the respective display parts of embodiment 1 and comparison example 1 are compared, the number of lack of pattern 32 on the slanted edge 31 disposed on the right side in particular is found to be significantly different. Specifically, while a lack of pattern 32 does not exist in the range shown in FIG. 2B on the edge 31 of the display part of embodiment 1, four lack of pattern 32 are found to exist in the range shown in FIG. 3B on the edge 31 of the display part of comparison example 1. This is because, in embodiment 1, the respective I-shaped openings 18b and 18c, which differ in shape from each of the openings 18a, are disposed in the offset region 30 while the respective openings 18a are not.

Figure 4A:
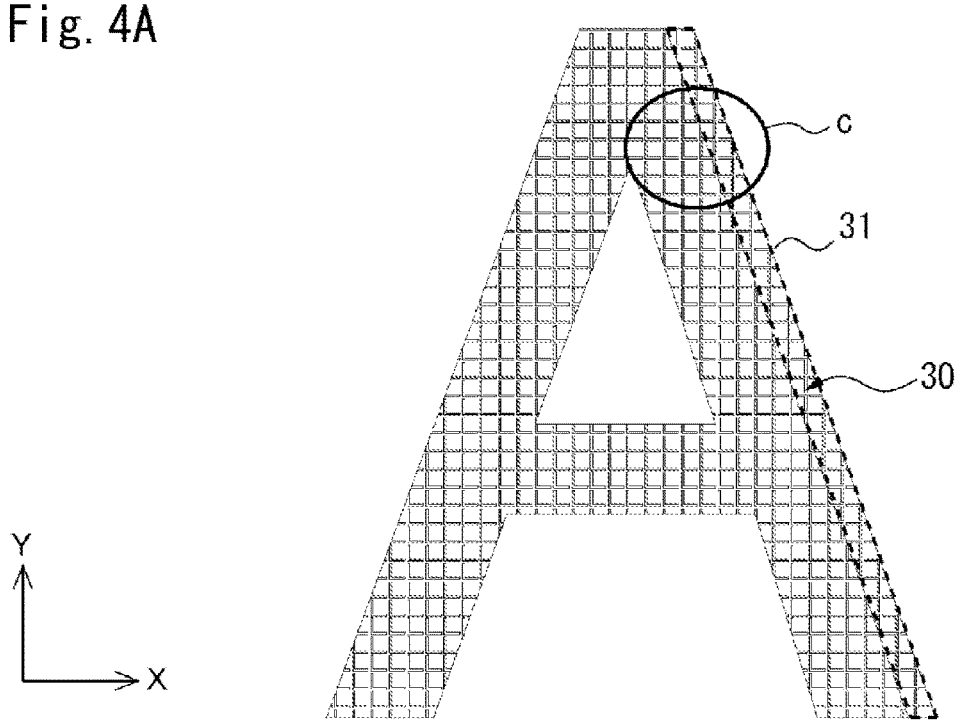
FIG. 4A is a plan view showing embodiment 2 of the display part.
Figure 4B:
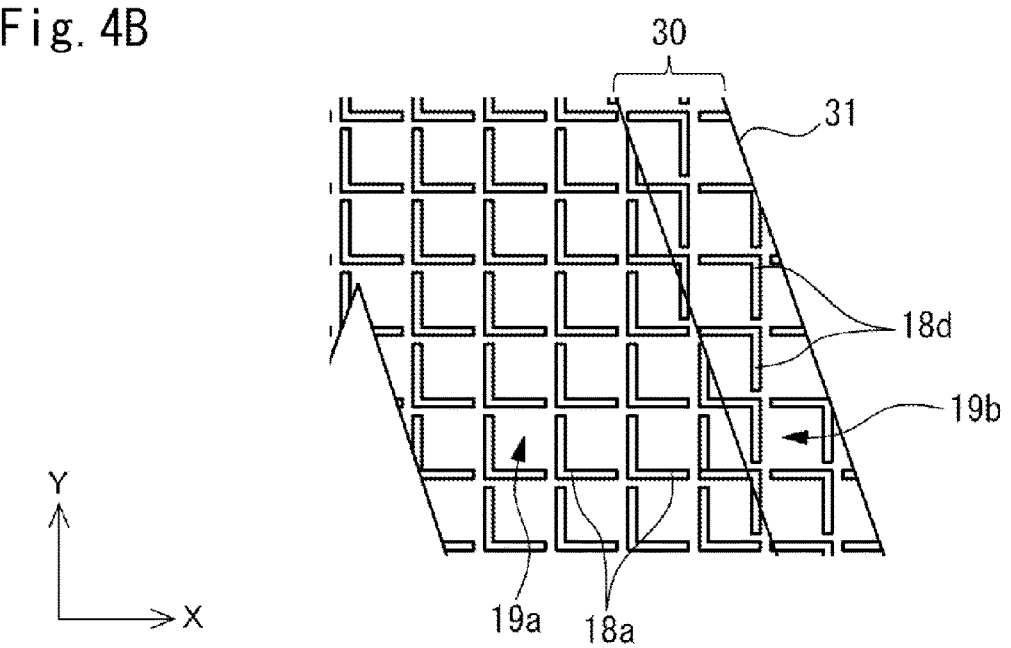
FIG. 4B is a partially enlarged view of area c of the display part shown in FIG. 4A.

FIG. 4A is a plan view showing embodiment 2 of the display part, and FIG. 4B is a partially enlarged view of area c of the display part shown in FIG. 4A. As shown in FIG. 4B, the respective openings 18 of embodiment 2 include two types: a plurality of L-shaped openings 18a wherein a branch part that extends in direction X and a branch part that extends in direction Y are configured to be connected at respective one ends sides, and a plurality of inverted L-shaped openings 18d wherein this opening 18a is rotated 180°. Specifically, as shown in FIG. 4B, an offset region 30 is set from a part of the edge 31 of the display part toward the inside, and the respective openings 18d are disposed in this offset region 30 while the respective openings 18a are not. In this example as well, lack of patterns readily occur on the slanted edge 31 on the right side of the display part, and therefore the offset region 30 is set as a region of a certain width from this right-side edge (refer to FIG. 4A). The width of the offset region 30 is preferably set larger than the longitudinal direction length of the branch part of each of the openings 18a. -Inside the display part, the respective openings 18a are disposed in the same manner as in embodiment 1 described above, and the respective regions 19a are similarly substantially rectangular in shape as well. Similarly, the respective regions 19d demarcated by the respective openings 18d are substantially rectangular in shape, and have substantially the same shape and same area as the region 19a.

According to such the embodiment 2, the advantage of decreasing the occurrence of lack of pattern 32 on the edge 31 of the display part is achieved in the same manner as in embodiment 1.

Figure 5A:
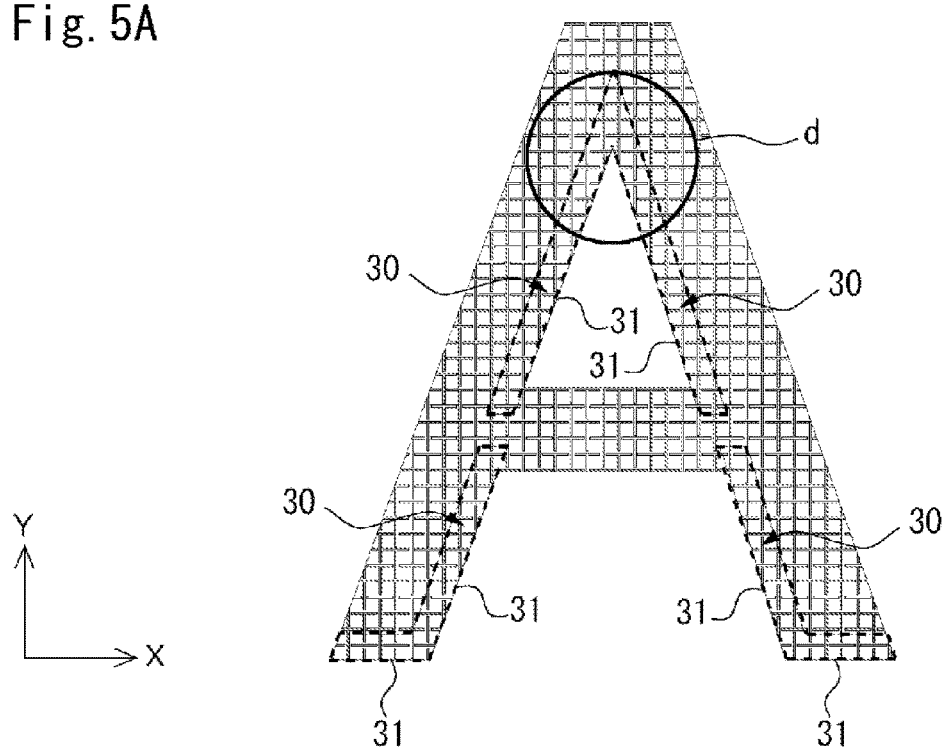
FIG. 5A is a plan view showing embodiment 3 of the display part.
Figure 5B:
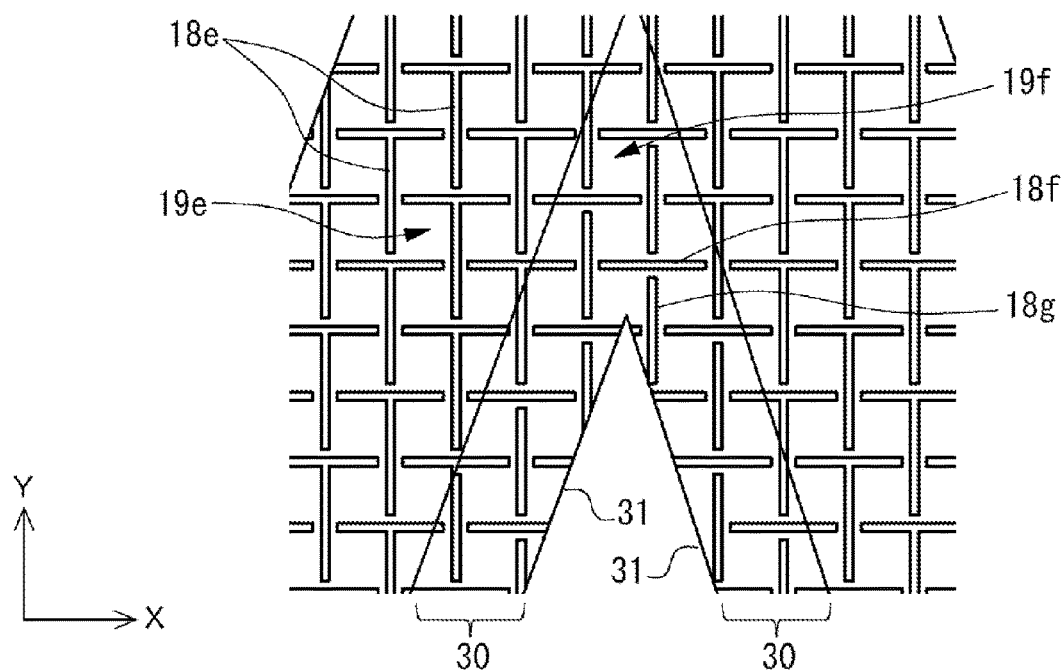
FIG. 5B is a partially enlarged view of area d of the display part shown in FIG. 5A.

FIG. 5A is a plan view showing embodiment 3 of the display part, and FIG. 5B is a partially enlarged view of area d of the display part shown in FIG. 5A. As shown in FIG. 5B, the respective openings 18 of embodiment 3 include three types: a plurality of T-shaped openings 18e wherein a relatively long branch part that extends in direction Y and two relatively short branch parts that extend in direction X are configured to be connected at respective one ends, a plurality of I-shaped openings 18f that extend in direction X, and a plurality of I-shaped openings 18g that extend in direction Y. Specifically, as shown in FIG. 5B, an offset region 30 is set from a part of the edge 31 of the display part toward the inside, and the respective openings 18f and 18g are disposed in this offset region 30 while the respective openings 18e are not.

In this example, lack of patterns readily occur on the slanted edge 31 and the bottom edge 31 on the inside of the character "A" on the display part, and therefore the offset region 30 is set as a region of a certain width from these edges 31 (refer to FIG. 5A). The width of the offset region 30 is preferably set larger than the longitudinal direction length of the branch part of each of the openings 18e. The respective openings 18f and the respective openings 18g are disposed in the offset region 30 in pairs of one opening 18f and one opening 18g. The pair of the opening 18f and the opening 18g is disposed in a T-shape overall, similar to that of each of the openings 18e, with one end of the opening 18g disposed near the center of the opening 18f. As an example, the branch part of each of the openings 18e and the like has a length of 0.14 mm in direction Y and 0.13 mm in direction X, and a disposed pitch of 0.16 mm in both direction X and direction Y. Further, the adjacent parts of the pair of the opening 18f and the opening 18g are preferably separated by a space of about 0.01 mm or larger.

Inside the display part, the plurality of openings 18e disposed in the T-shape is aligned, forming a row along direction X and a column along direction Y. Further, the branch parts along direction X of the openings 18e that are adjacent in direction X are linearly disposed overall, with the positions in direction Y substantially the same. Furthermore, the branch parts along direction Y of the openings 18e that are adjacent in direction Y are linearly disposed overall, with the positions in direction X substantially the same. Each of the regions 19e enclosed by the three openings 18e is substantially rectangular in shape, as shown. The respective openings 18f and 18g are aligned, forming a row in direction X and a column in direction Y. Further, the openings 18g that are adjacent in direction Y are linearly disposed overall, with the positions in direction X substantially the same. Similarly, the openings 18f that are adjacent in direction Y are linearly disposed overall, with the positions in direction Y substantially the same. Regions 19f enclosed by two openings 18f and two openings 18g are substantially rectangular in shape, as shown, and regions 19f and the regions 19e have substantially the same shape and same area.

Figure 6A:
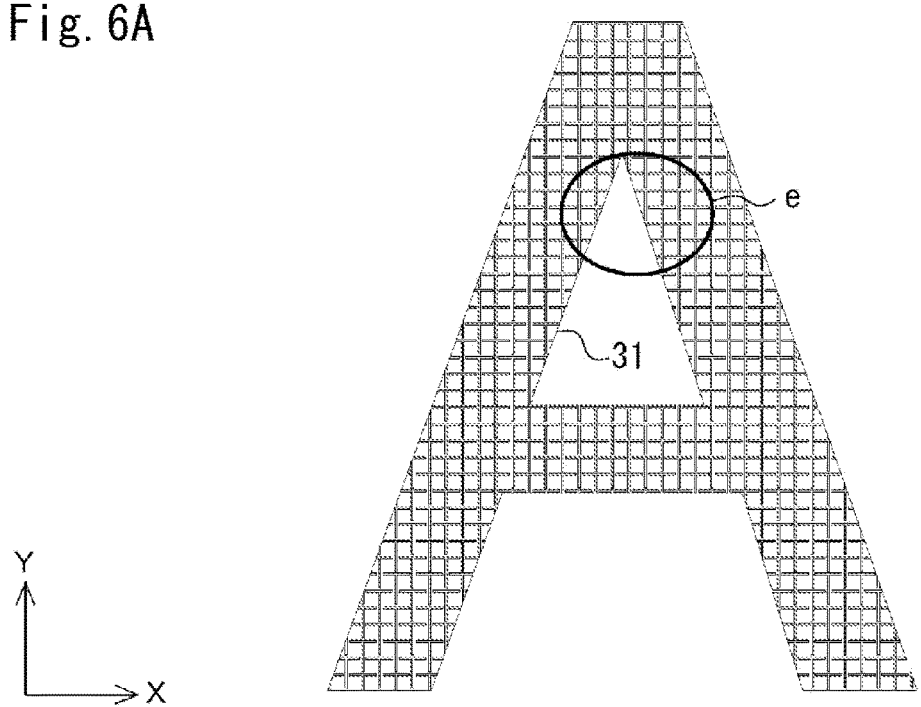
FIG. 6A is a plan view showing comparison example 2 of the display part.
Figure 6B:
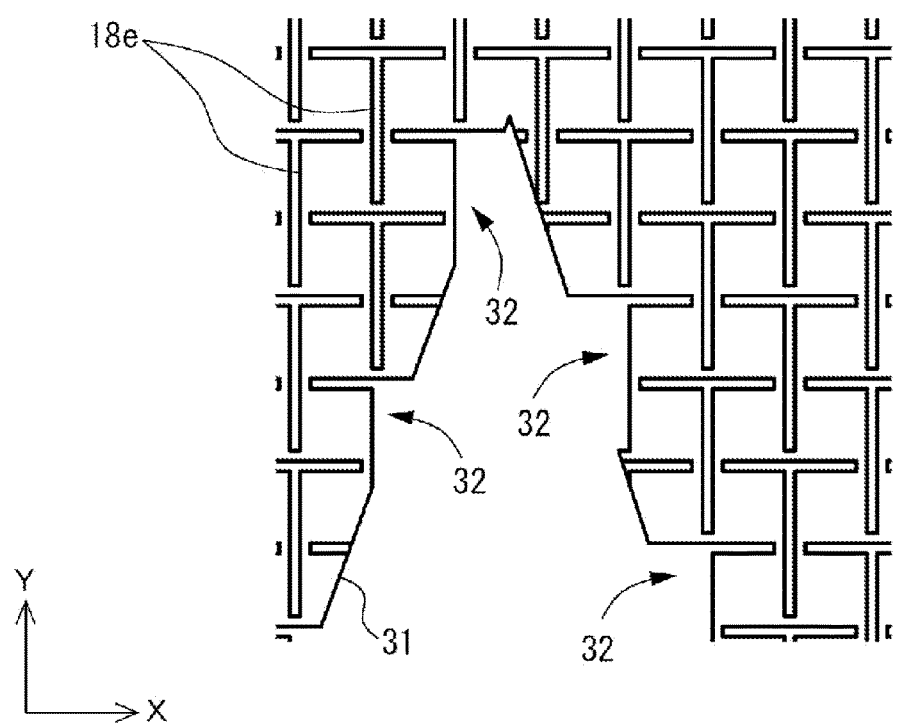
FIG. 6B is a partially enlarged view of area e of the display part shown in FIG. 6A.

FIG. 6A is a plan view showing comparison example 2 of the display part, and FIG. 6B is a partially enlarged view of area e of the display part shown in FIG. 6A. As shown in FIG. 6B, inside the display part of comparison example 2, only the plurality of T-shaped openings 18e is arranged in a matrix pattern. Specifically, the plurality of openings 18e is arranged in a line along direction X and direction Y, respectively. Further, the respective branch parts along direction X of the openings 18h that are adjacent in direction X are linearly disposed overall, with the positions in direction Y substantially the same. Similarly, the branch parts along direction Y of the openings 18h that are adjacent in direction Y are linearly disposed overall, with the positions in direction X substantially the same.

When the edges 31 of the respective display parts of embodiment 3 and comparison example 2 are compared, the number of lack of pattern 32 on edge 31 is found to be significantly different. Specifically, while a lack of pattern 32 does not exist in the range shown in FIG. 5B on the edge 31 of the display part of embodiment 3, four lack of pattern 32 are found to exist in the range shown in FIG. 6B on the edge 31 of the display part of comparison example 2. This is because, in embodiment 3, the respective I-shaped openings 18f and 18g, which differ in shape from each of the openings 18e, are disposed in the offset region 30 while the respective openings 18e are not.

Figure 7A:
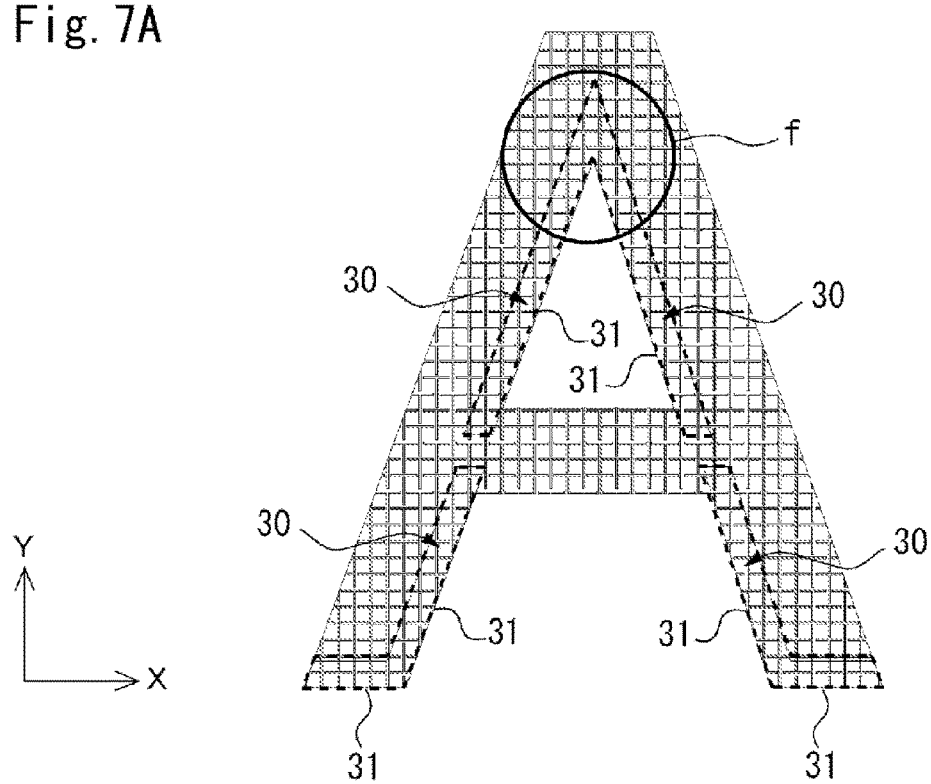
FIG. 7A is a plan view showing embodiment 4 of the display part.
Figure 7B:
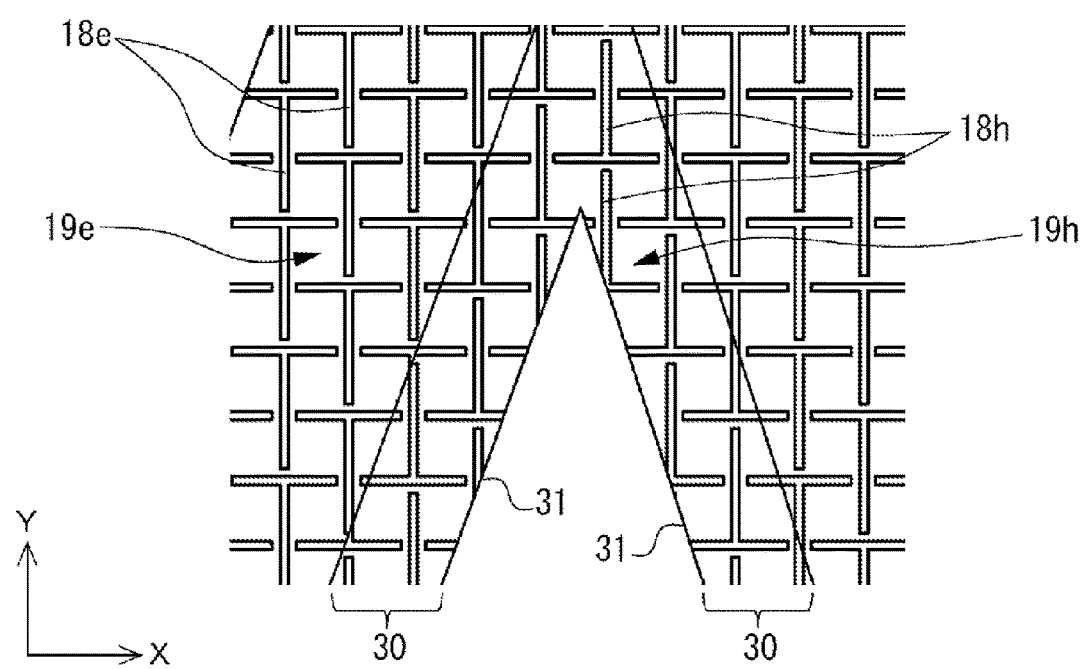
FIG. 7B is a partially enlarged view of area f of the display part shown in FIG. 7A.

FIG. 7A is a plan view showing embodiment 4 of the display part, and FIG. 7B is a partially enlarged view of area f of the display part shown in FIG. 7A. As shown in FIG. 7B, the respective openings 18 of embodiment 4 include two types: a plurality of T-shaped openings 18e wherein a relatively long branch part that extends in direction Y and two relatively short branch parts that extend in direction X are configured to be connected at respective one ends, a plurality of inverted T-shaped openings 18h wherein this opening 18e is rotated 180°. Specifically, as shown in FIG. 7B, an offset region 30 is set from a part of the edge 31 of the display part toward the inside, and the respective openings 18h are disposed in this offset region 30 while the respective openings 18e are not. Inside the display part, the respective openings 18e are disposed in the same manner as in embodiment 3 described above, and the respective regions 19e are similarly substantially rectangular in shape as well. Similarly, the respective regions 19h demarcated by the respective openings 18h are substantially rectangular in shape, and have substantially the same shape and same area as the region 19e.

According to such the embodiment 4, the advantage of decreasing the occurrence of lack of pattern 32 on the edge 31 of the display part is achieved in the same manner as in embodiment 3.

Figure 8A:
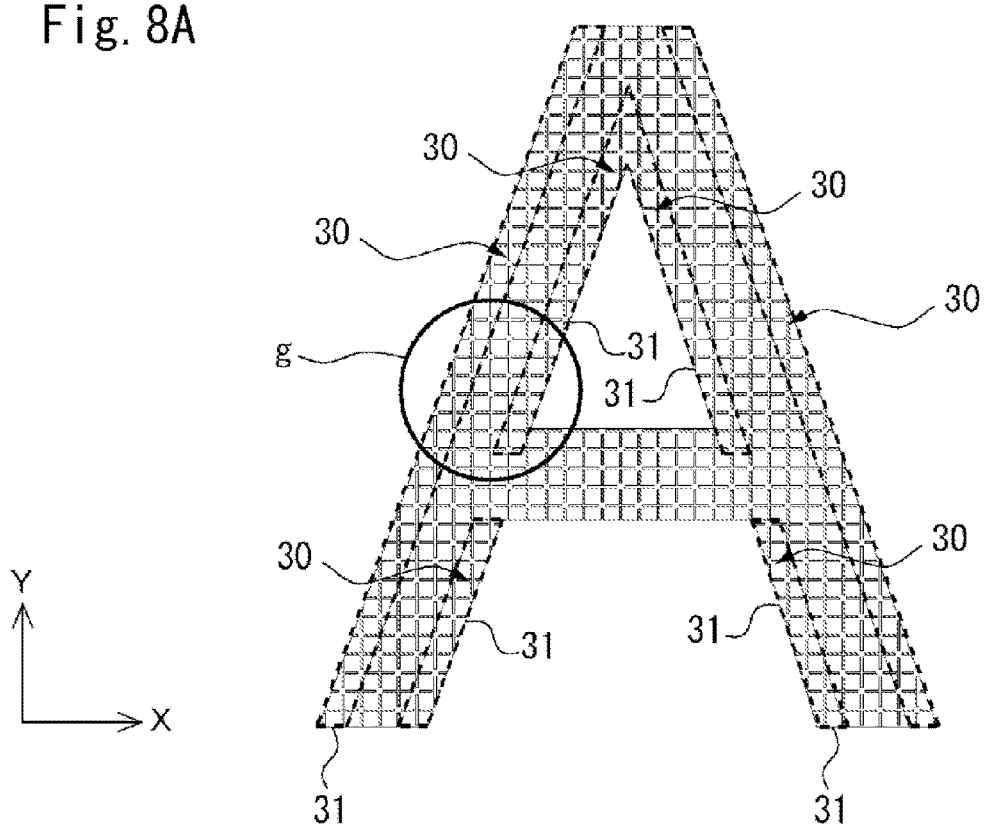
FIG. 8A is a plan view showing embodiment 5 of the display part.
Figure 8B:
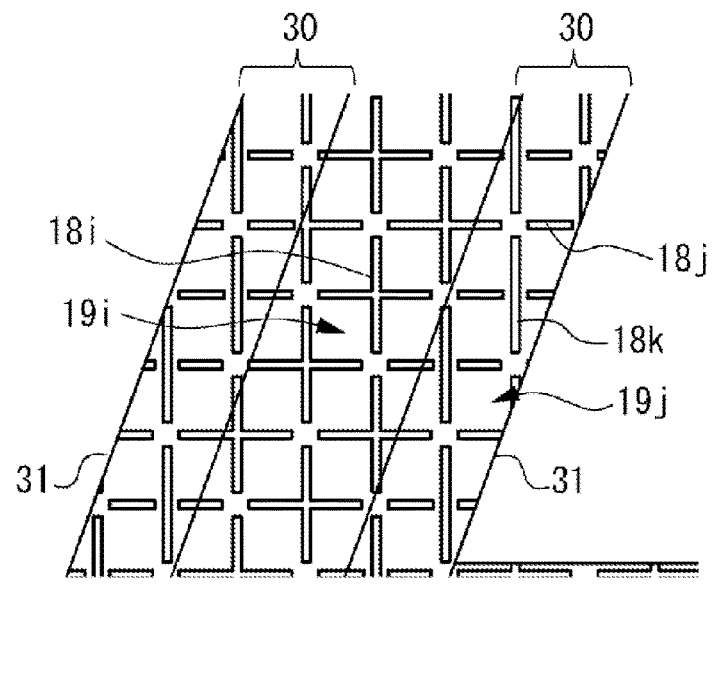
FIG. 8B is a partially enlarged view of area g of the display part shown in FIG. 8A.

FIG. 8A is a plan view showing embodiment 5 of the display part, and FIG. 8B is a partially enlarged view of area g of the display part shown in FIG. 8A. As shown in FIG. 8B, the respective openings 18 of embodiment 5 include three types: a plurality of cross-shaped openings 18i wherein two relatively long branch parts that extends in direction Y and two relatively short branch parts that extend in direction X are configured to be connected at respective one ends, a plurality of I-shaped openings 18j that extend in direction X, and a plurality of I-shaped openings 18k that extend in direction Y. Specifically, as shown in FIG. 8B, an offset region 30 is set from a part of the edge 31 of the display part toward the inside, and the respective openings 18j and 18k are disposed in this offset region 30 while the respective openings 18i are not.

In this example, lack of patterns readily occur on the slanted edge 31 and the bottom edge 31 on the inside of the character "A" on the display part, and therefore the offset region 30 is set as a region of a certain width from these edges 31 (refer to FIG. 8A). The width of the offset region 30 is preferably set larger than the longitudinal direction length of the branch part of each of the openings 18i. The respective openings 18j and the respective openings 18k are disposed so that two openings 18j sandwich the center of one opening 18k at respective one ends, forming an overall cross shape similar to that of each of the openings 18e. As an example, the branch part of each of the openings 18i and the like has a length of 0.14 mm in both direction X and direction Y, and a disposed pitch of 0.16 mm in both direction X and direction Y. Further, the adjacent parts of the end of each of the openings 18j and the opening 18k are preferably separated by a space of about 0.01 mm or larger.

Inside the display part, the plurality of openings 18i is aligned, forming a row along direction X and a column along direction Y. Further, the branch parts along direction X of the openings 18i that are adjacent in direction X are linearly disposed overall, with the positions in direction Y substantially the same. The branch parts along direction Y of the openings 18i that are adjacent in direction Y are linearly disposed overall, with the positions in direction X substantially the same. Each of the regions 19*i* enclosed by the two openings 18*i* is substantially rectangular in shape, as shown. The respective openings 18*j* and 18*k* are aligned, forming a row in direction X and a column in direction Y. Further, the openings 18*j* that are adjacent in direction X are linearly disposed overall, with the positions in direction Y substantially the same. Similarly, the openings 18*k* that are adjacent in direction Y are linearly disposed overall, with the positions in direction Y substantially the same. Regions 19*j* enclosed by two openings 18*j* and two openings 18*k* are substantially rectangular in shape, as shown, and regions 19*j* and the regions 19*i* have substantially the same shape and same area.

Figure 9A:
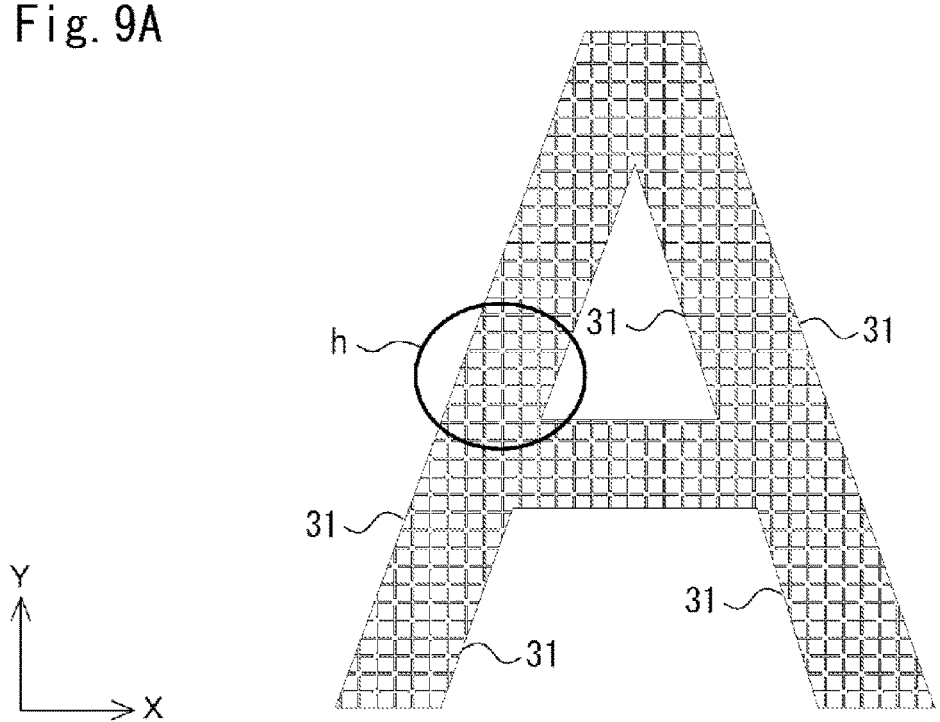
FIG. 9A is a plan view showing comparison example 3 of the display part.
Figure 9B:
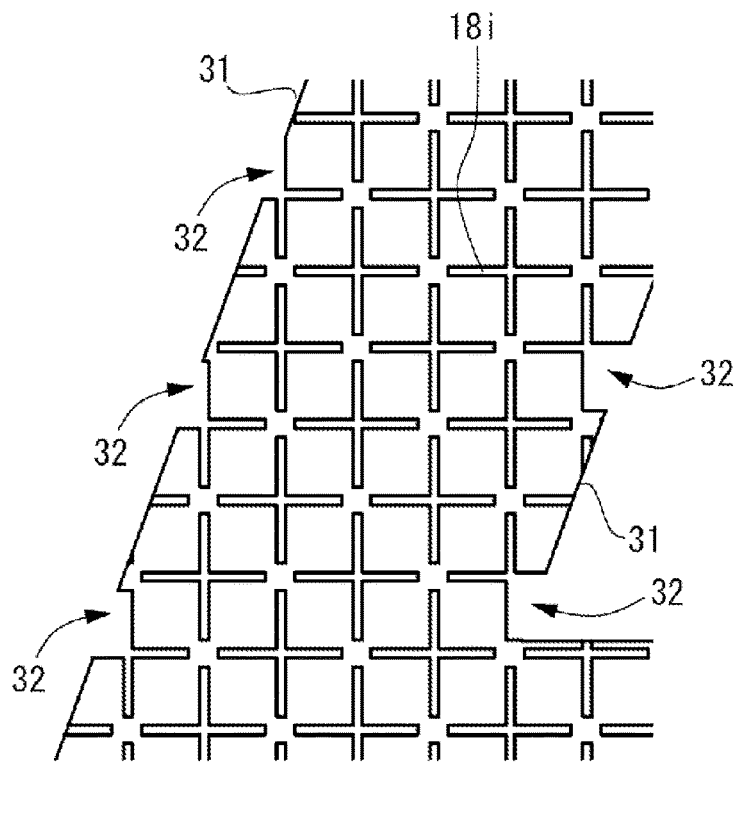
FIG. 9B is a partially enlarged view of area h of the display part shown in FIG. 9A.

FIG. 9A is a plan view showing comparison example 3 of the display part, and FIG. 9B is a partially enlarged view of area h of the display part shown in FIG. 9A. As shown in FIG. 9B, inside the display part of comparison example 3, only the plurality of cross-shaped openings 18*i* is arranged in a matrix pattern. Specifically, the plurality of openings 18*i* is arranged in a line along direction X and direction Y, respectively. Further, the respective branch parts along direction X of the openings 18*i* that are adjacent in direction X are linearly disposed overall, with the positions in direction Y substantially the same. Similarly, the branch parts along direction Y of the openings 18*i* that are adjacent in direction Y are linearly disposed overall, with the positions in direction X substantially the same.

When the edges 31 of the respective display parts of embodiment 5 and comparison example 3 are compared, the number of lack of pattern 32 on edge 31 is found to be significantly different. Specifically, while a lack of pattern 32 does not exist in the range shown in FIG. 8B on the edge 31 of the display part of embodiment 5, five lack of pattern 32 are found to exist in the range shown in FIG.

9B on the edge 31 of the display part of comparison example 3. This is because, in embodiment 5, the respective I-shaped openings 18*j* and 18*k*, which differ in shape from each of the openings 18*i*, are disposed in the offset region 30 while the respective openings 18*i* are not.

Figure 10A:
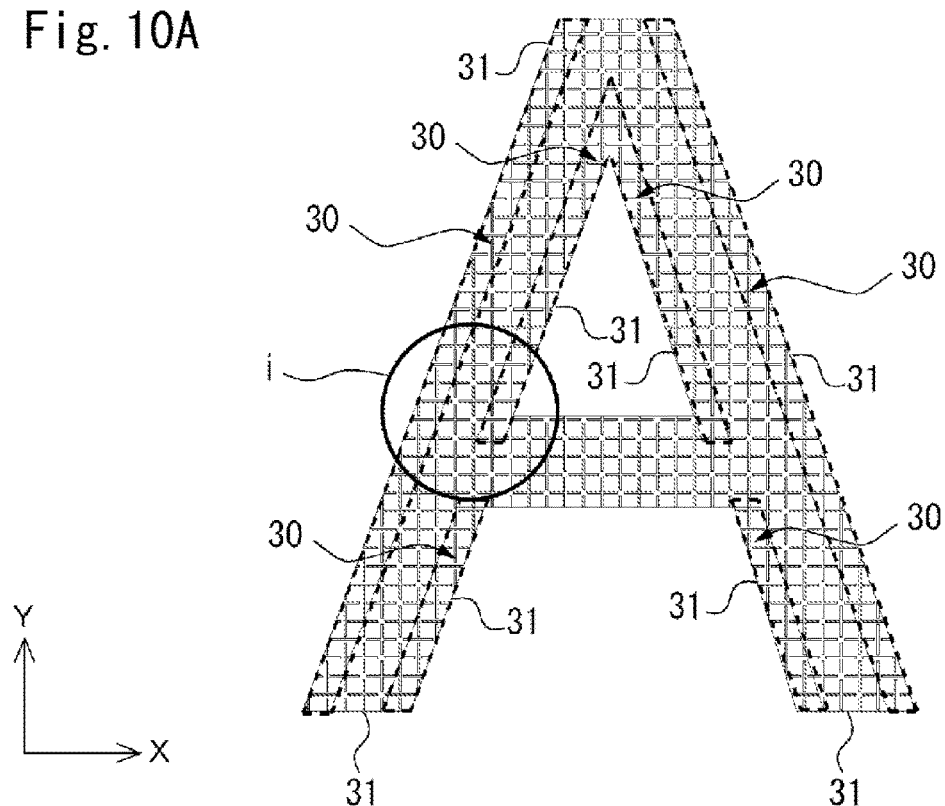
FIG. 10A is a plan view showing embodiment 6 of the display part.
Figure 10B:
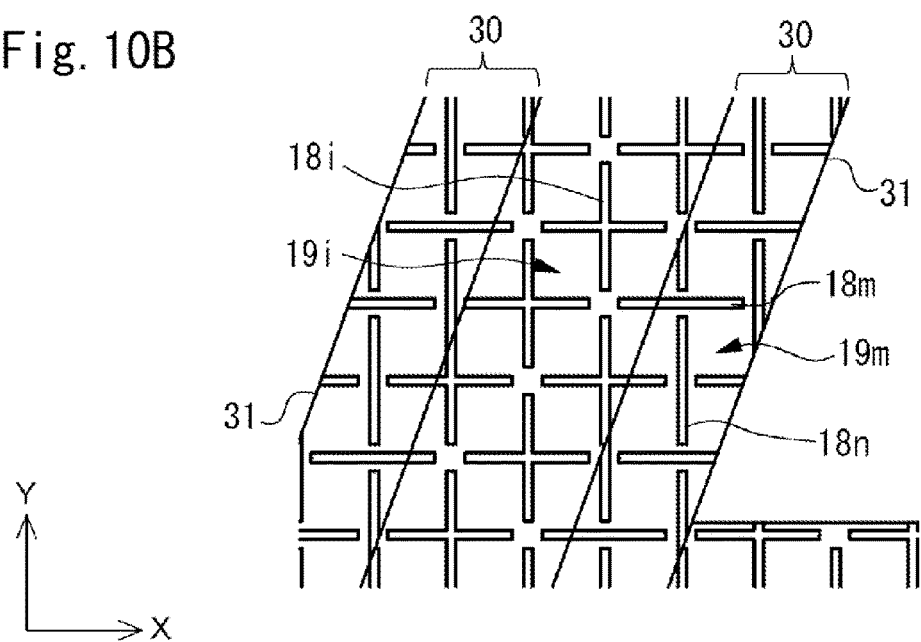
FIG. 10B is a partially enlarged view of area i of the display part shown in FIG. 10A.

FIG. 10A is a plan view showing embodiment 6 of the display part, and FIG. 10B is a partially enlarged view of area i of the display part shown in FIG. 10A. As shown in FIG. 10B, the respective openings 18 of embodiment 6 include three types: a plurality of cross-shaped openings 18*i* wherein two relatively long branch parts that extends in direction Y and two relatively short branch parts that extend in direction X are configured to be connected at respective one ends, a plurality of I-shaped openings 18*m* that extend in direction X, and a plurality of I-shaped openings 18*n* that extend in direction Y. Specifically, as shown in FIG. 10B, an offset region 30 is set from a part of the edge 31 of the display part toward the inside, and the respective openings 18*m* and 18*n* are disposed in this offset region 30 while the respective openings 18*i* are not. The difference from embodiment 5 is that the longitudinal direction length of each of the openings 18*m* disposed in the offset region 30 is longer than that of each of the openings 18*j* in embodiment 5. Further, inside the display part, the respective openings 18*i* are disposed in the same manner as in embodiment 5 described above, and the respective regions 19*i* are similarly substantially rectangular in shape as well. Regions 19*m* enclosed by two openings 18*m* and two openings 18*n* are substantially rectangular in shape, as shown, and regions 19*m* and the regions 19*i* have substantially the same shape and same area.

According to such the embodiment 6, the advantage of decreasing the occurrence of lack of pattern 32 on the edge 31 of the display part is achieved in the same manner as in embodiment 5.

Figure 11A:
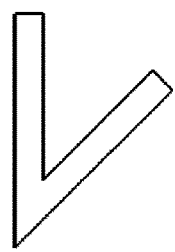
FIGS. 11A-11E are plan views respectively showing variations of the openings.
Figure 11B:
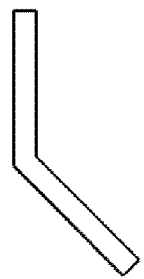
Figure 11C:
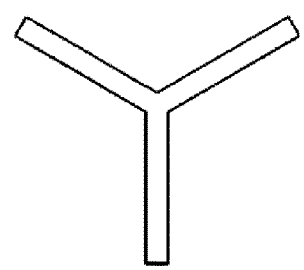
Figure 11D:
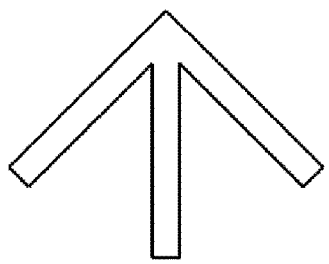
Figure 11E:
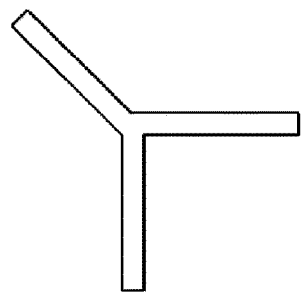
Figure 12A:
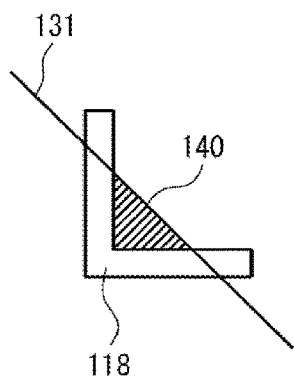
FIGS. 12A-12C are plan views provided to explain the principle of the invention.
Figure 12B:
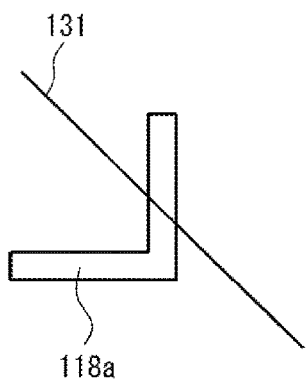
Figure 12C:
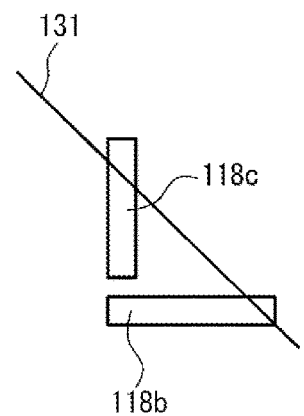

Note that this invention is not limited to the subject matter of the foregoing embodiments, and can be implemented by being variously modified within the scope of the gist of the present invention. For example, while the respective L-shaped, T-shaped, and cross-shaped openings are disposed in regions other than the offset region inside the display part in each of the embodiments described above, the shape of each of the openings is not limited thereto. Specifically, a shape wherein two branch parts are connected so that the angle formed by the respective longitudinal directions is an acute angle as shown in FIG. 11A, or a shape wherein two branch parts are connected so that the angle formed by the respective longitudinal directions is an obtuse angle as shown in FIG. 11B may serve as the basic shape of each of the openings. Further, a Y-shape wherein three branch parts are connected at respective one ends as shown in FIG. 11C may serve as the basic shape of the respective openings. A shape wherein three branch parts are connected so that the angles formed by the longitudinal direction of one of the branch parts and the respective longitudinal directions of the other two branch parts are acute angles as shown in FIG. 11D may serve as the basic shape of each of the openings. Further, a shape wherein three branches are connected so that the angle formed by the respective longitudinal directions of two of the three branch parts is a right angle, and the angles formed by the longitudinal direction of the other branch part and the respective longitudinal directions of the two branch parts are obtuse angles as shown in FIG. 11E may serve as the basic shape of each of the openings. Further, the edges of branch parts of the respective openings may be bent, or may be formed in a curved shape.

Further, while the embodiments described above illustrate a segment display type liquid crystal display apparatus, the present invention may be applied to a dot matrix display type liquid crystal display apparatus. In particular, in the case of a dot matrix display type liquid crystal display apparatus wherein the shape of each of the pixels is not rectangular, but is a shape that includes a bent edge, it is possible to advantageously suppress the disturbance of the contour shape of each of the pixels by applying the present invention.

Further, while the respective openings are provided only to one electrode in the embodiments described above, the openings may be provided to both electrodes.

What is claimed is:
1. A liquid crystal display apparatus comprising:
 a first substrate and a second substrate disposed facing each other,
 a first electrode provided to the first substrate,
 a second electrode provided to the second substrate, and
 a liquid crystal layer disposed between the first substrate and the second substrate,
 wherein:
 a display part is demarcated in a region where the first electrode and the second electrode overlap, and an offset region of a predetermined width from at least a part of an edge to the inside is set in the display part,
 at least one of the first electrode and the second electrode comprises a plurality of first openings disposed in a region other than the offset region of the display part, and a plurality of second openings disposed in the offset region of the display part, in planar view, each of the plurality of first openings comprises a section wherein a branch part disposed so that a longitudinal direction thereof extends along a first direction and a branch part disposed so that a longitudinal direction thereof extends along a second direction different from the first direction are connected at respective one ends, in the planar view, each of the plurality of second openings includes a plurality of openings disposed so that a longitudinal direction thereof extends along the first direction, and a plurality of openings disposed so that a longitudinal direction thereof extends along the second direction, in the planar view, a shape of each of the plurality of first openings is different from a shape of each of the plurality of second openings, and the width of the offset region is larger than at least one of (i) a length in the longitudinal direction of the branch part along the first direction of each of the plurality of first openings and (ii) a length in the longitudinal direction of the branch part along the second direction of each of the plurality of first openings.

2. The liquid crystal display apparatus according to claim 1, wherein each of the plurality of first openings is substantially L-shaped, substantially T-shaped, or substantially cross-shaped.

3. The liquid crystal display apparatus according to claim 1, wherein the display part is a segment display type display part in which a character or design of a display target is directly formed.

4. The liquid crystal display apparatus according to claim 2, wherein the display part is a segment display type display part in which a character or design of a display target is directly formed.

5. The liquid crystal display apparatus according to claim 1, wherein the plurality of openings of the second openings which are disposed so that the longitudinal direction thereof extends along the first direction are not connected to the plurality of openings of the second openings which are disposed so that the longitudinal direction thereof extends along the second direction.

6. A liquid crystal display apparatus comprising:
a first substrate and a second substrate disposed facing each other,
a first electrode provided to the first substrate,
a second electrode provided to the second substrate, and
a liquid crystal layer disposed between the first substrate and the second substrate,
wherein a display part is demarcated in a region where the first electrode and the second electrode overlap, and an offset region of a predetermined width from at least a part of an edge to the inside is set in the display part,
at least one of the first electrode and the second electrode comprises a plurality of first openings disposed in a region other than the offset region of the display part, and a plurality of second openings disposed in the offset region of the display part, in planar view, each of the plurality of first openings comprises a section wherein a branch part disposed so that a longitudinal direction thereof extends along a first direction and a branch part disposed so that a longitudinal direction thereof extends along a second direction different from the first direction are connected at respective one ends, in the planar view, each of the plurality of second openings includes a plurality of openings disposed so that a longitudinal direction thereof extends along the first direction, and a plurality of openings disposed so that a longitudinal direction thereof extends along the second direction, in the planar view, and each of the plurality of second openings has substantially the same shape as each of the plurality of first openings, and is disposed in a different orientation than each of the plurality of first openings, in the planar view.

7. The liquid crystal display apparatus according to claim 6, wherein each of the plurality of first openings is substantially L-shaped, substantially T-shaped, or substantially cross-shaped.

8. The liquid crystal display apparatus according to claim 6, wherein the width of the offset region is larger than at least one of (i) a length in the longitudinal direction of the branch part along the first direction of each of the plurality of first openings and (ii) a length in the longitudinal direction of the branch part along the second direction of each of the plurality of first openings.

9. The liquid crystal display apparatus according to claim 7, wherein the width of the offset region is larger than at least one of (i) a length in the longitudinal direction of the branch part along the first direction of each of the plurality of first openings and (ii) a length in the longitudinal direction of the branch part along the second direction of each of the plurality of first openings.

10. The liquid crystal display apparatus according to claim 6, wherein the display part is a segment display type display part in which a character or design of a display target is directly formed.

11. The liquid crystal display apparatus according to claim 7, wherein the display part is a segment display type display part in which a character or design of a display target is directly formed.

12. The liquid crystal display apparatus according to claim 8, wherein the display part is a segment display type display part in which a character or design of a display target is directly formed.

13. The liquid crystal display apparatus according to claim 9, wherein the display part is a segment display type display part in which a character or design of a display target is directly formed.

* * * * *